Figure 1:
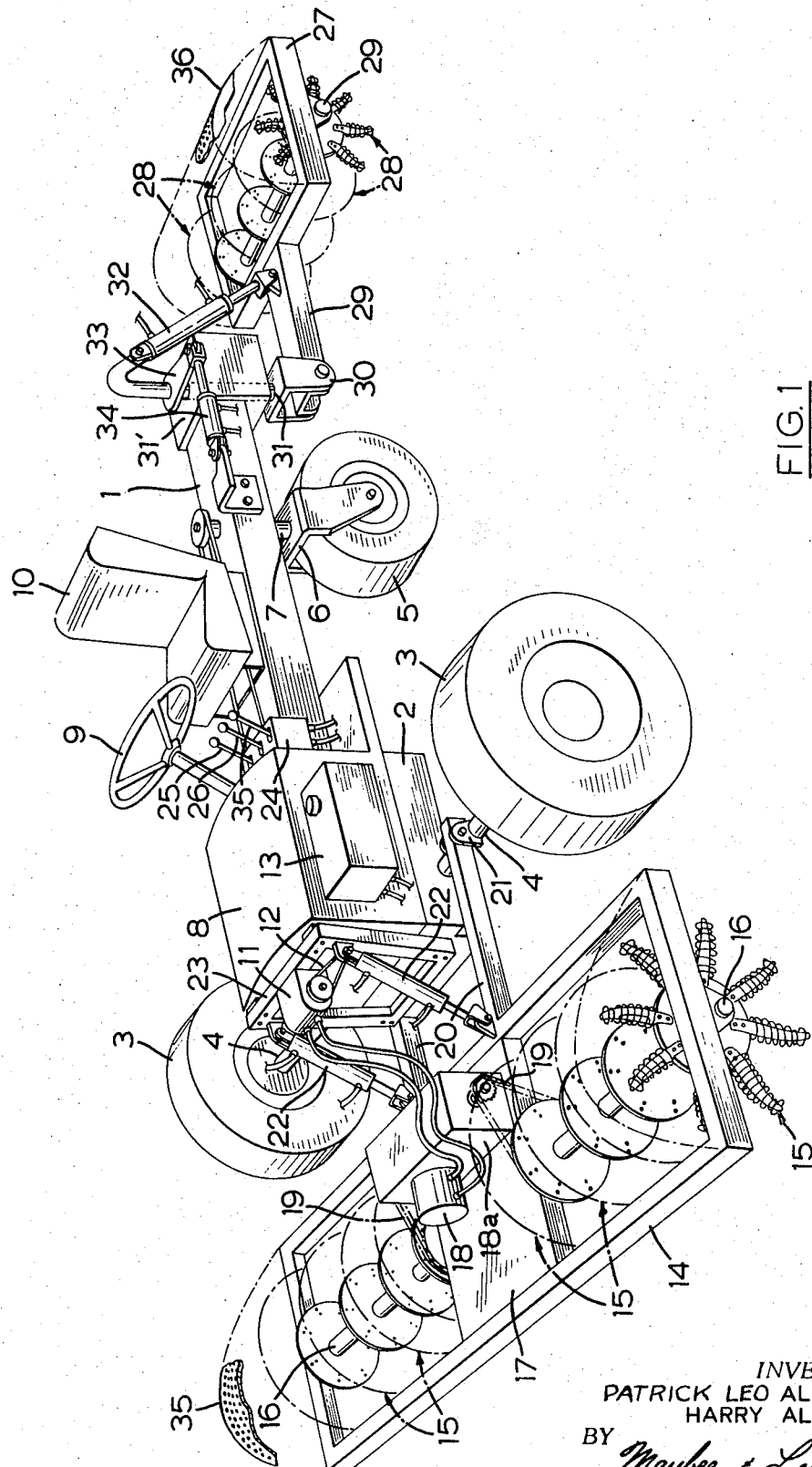

United States Patent

[11] 3,570,604

| [72] | Inventors | Patrick Leo Allard<br>3439 Wolfdale Ave, Mississauga, Ontario;<br>Harry Allard, R.R. 4, Stouffville, Ontario,<br>Canada |
|---|---|---|
| [21] | Appl. No. | 775,808 |
| [22] | Filed | Nov. 14, 1968 |
| [45] | Patented | Mar. 16, 1971 |

[54] SOIL PENETRATING IMPLEMENTS
6 Claims, 4 Drawing Figs.

[52] U.S. Cl.................................................. 172/22,
 172/116, 172/123, 172/240, 180/7
[51] Int. Cl........................................................ A01b 45/02
[50] Field of Search.......................................... 172/21, 22,
 116, 123, 240, 276, 300; 180/1, 9.32, 23

[56] References Cited
UNITED STATES PATENTS

| 2,205,997 | 7/1939 | Wallace et al. ............... | 172/21 |
| 2,580,236 | 12/1951 | Mascaro....................... | 172/21X |
| 3,171,498 | 3/1965 | Logan .......................... | 172/22 |
| 3,351,037 | 11/1967 | Meili............................. | 180/23X |
| 3,417,832 | 12/1968 | Ziccardi....................... | 180/9.32 |

FOREIGN PATENTS

| 850,569 | 10/1960 | Great Britain................ | 172/21 |

*Primary Examiner*—Robert E. Pulfrey
*Assistant Examiner*—C. Coughenour
*Attorney*—Maybee & Lagris ABSTRACT: A soil penetrating implement on which spiking wheels are journaled on frames which are hingedly mounted to the front and rear of a vehicle and means are provided for swinging the frames downwardly to raise the vehicle frame upwardly and lift the vehicle wheels from the surface on which they are supported, thus causing the spikes to penetrate the said surface.

INVENTORS
PATRICK LEO ALLARD
HARRY ALLARD
BY Maybee & Legris
ATTORNEYS

SOIL PENETRATING IMPLEMENTS

This invention relates to soil penetrating implements such as are used in loosening and aerating soil, and the invention is particularly applicable to the aeration of lawns such as fairways and greens of golf courses.

Heretofore such implements have comprised a plurality of spikes or prongs which project radially from an axle or shaft journaled on a frame. When used as an aerator for lawns, the spikes or prongs are usually curved in the direction of rotation and hollow at their ends, called spoons, whereby earth entering the hollow ends will be removed in the form of cylindrical pieces of earth or plugs which will be dropped on the surface of the lawn.

Heretofore such implements are usually either large heavily weighted devices which are pulled behind a tractor, or comparatively small devices which are pushed by hand and which have a small motor which will rotate the spiking wheel or wheels, driving them into the ground.

While the first type of implement is satisfactory on large lawns, such as fairways of golf courses, it is not so satisfactory on greens or other small grass spaces. The second type of implement is very slow and on hard earth its weight is insufficient to cause the spoons to penetrate sufficiently into the ground.

According to the present invention, spiking wheels are journaled on frames which are hingedly mounted to the front and rear of a vehicle and means are provided for swinging the frames downwardly to raise the vehicle frame upwardly and lift the vehicle wheels from the surface on which they are supported, thus causing the spikes to penetrate the said surface.

Figure 2:
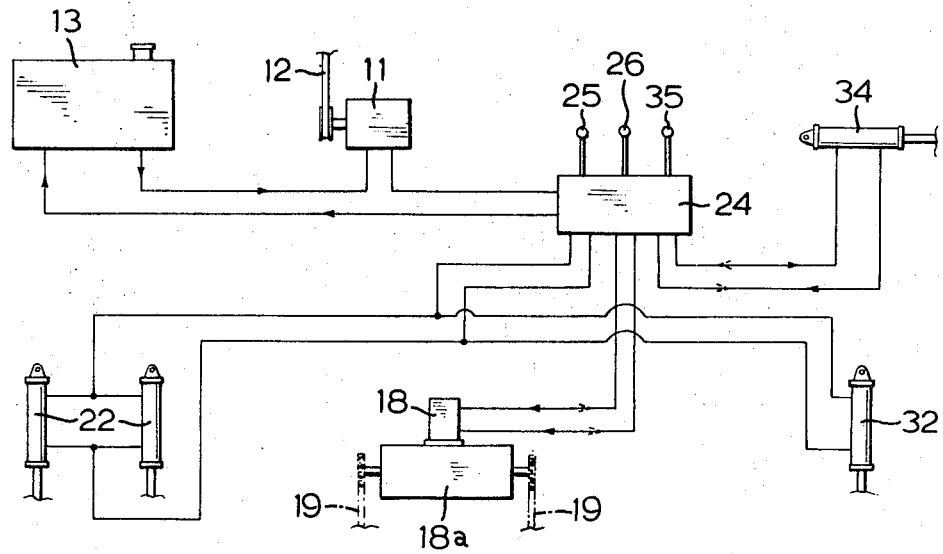
Figure 3:
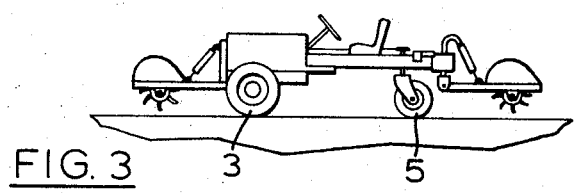
Figure 4:
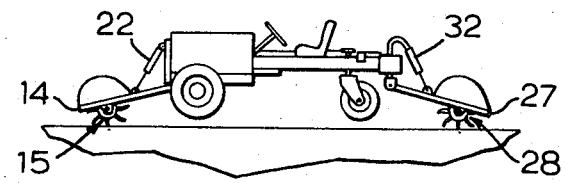

The invention is hereinafter more particularly described and illustrated in the annexed drawings in which:

FIG. 1 is a side perspective view of a soil penetrating implement in accordance with the invention, FIG. 2 is a hydraulic circuit used for operating the implement, FIG. 3 is a diagrammatic view on a small scale showing the vehicle with the spiking wheels raised from the ground, and FIG. 4 is a similar view showing the spiking wheels engaging the ground and the vehicle wheels raised off the ground.

In the drawings corresponding reference numerals refer to corresponding parts in the different FIGS.

The vehicle on which the spiking wheels are mounted may be of any standard construction, such as a small front wheel drive tractor of the type used for pulling lawn mowers or small agricultural implements.

The vehicle illustrated in FIG. 1 is a standard "Toro" (trademark) lawn mower or cultivator provided with a Y-frame and two front driving wheels and one rear driving wheel, although a four wheel frame would serve as well. The engine and drive mechanism for the front wheels is also standard "Toro" construction and details of these are not shown. The drive mechanism includes a standard clutch for coupling and uncoupling the driving wheels to the engine.

Referring to FIG. 1, the vehicle frame comprises a rearwardly extending frame member 1 and a U-shaped forwardly extending frame member 2. Front wheels 3 are rotatably mounted on transverse axles 4 secured to frame member 2.

Rear wheel 5 is rotatably mounted on a U-shaped bracket 6. A vertical pin 7 extending from the bracket 6 is pivotally mounted or journaled in rearwardly extending frame member An internal combustion engine within the hood 8 drives the front wheels in a known manner. The vehicle may be steered by rotating the rear wheel 5 through the medium of the steering wheel 9, by means of known steering mechanism not shown. A driver's seat 10 may be provided mounted on rear frame member 1.

An hydraulic pump 11 is powered from the takeoff shaft of the engine by a belt or chain 12 and is connected to a reservoir 13. The various tubes or pipes for conveying hydraulic fluid are not shown in FIG. 1 but are illustrated in FIG. 2.

The front hinged frame 14 is rectangular in shape being formed by two spaced-apart frame members extending transversely of the vehicle and four cross frame members. At each end of the frame 14 sets of four spiking wheels 15 are mounted on shafts 16, 16, extending between cross frame members. Between the two intermediate cross frame members is a platform 17 on which is mounted an hydraulic motor 18 provided with a variable speed transmission 18a. The spiking wheels are driven through the medium of chains 19, 19.

The front frame member 14 is hingedly mounted on the vehicle frame by means of rearwardly extending arms 20, 20 pivoted to shackles 21 on the front axle 4 of the vehicle.

The front swung up and down frame 14 may be by means of hydraulic jacks 22, 22 pivotally connected to vertical vehicle frame member 23 and to arms 20, 20 at or adjacent to their junction with the frame 14. The frame 14 is so arranged that when the wheels 3 and 5 are on the ground, the ends of the spiking wheels 15 may contact the ground or other surface on which the vehicle stands. However, by actuating the cylinders 22 the frame 14 may be swung upwardly to raise the spiking wheels off the ground. This may be done when the vehicle is moving from one location to another. By actuating the hydraulic jacks 22, 22 the spiking wheels may be forced into the ground or other surface on which the vehicle is supported as hereinafter described.

A control box 24 is located near the driver's seat 10 and the hydraulic lines from the pump 11 and hydraulic reservoir 13 run to the control box from which the hydraulic fluid is directed to the various operating jacks. Lever 25 controls the raising and lowering of the front hinged frame 14. Lever 26 controls the flow of fluid to the hydraulic motor 18 which rotates the spiking wheels 15.

Vehicle chassis member 1 extends rearwardly beyond the rear wheel 5, and a rear spiking wheel frame 27 is hingedly mounted thereon. This rear frame 27 is rectangular in form and is formed by two spaced-apart frame members extending transversely of the vehicle and two end cross frame members. A set of four spiking wheels 28 is mounted on a transverse shaft 29 journaled in the end cross frame members. The rear frame occupies about the space occupied by the front platform 17, so that when the implement is in operation, an area of the total width of the front frame 14 will be aerated. The sets of spiking wheels in the front and rear frames are arranged as shown to penetrate the surface in a substantially uniform pattern over an area substantially equal to the width of the implement.

The rear frame 27 is hingedly mounted on the vehicle frame for up and down swinging movement by a rearwardly extending central arm 29 pivoted to a U-shaped bracket 30 from the crossbar of which extends a vertical pin 31 journaled in bearing 31'. Thus, frame 27 is not only hinged for vertical movement but will swing transversely relative to the frame of the vehicle.

The frame 27 can be raised and lowered by means of an hydraulic jack 32 which is pivoted to the arm 29 at or adjacent to its point of connection with frame 27. The hydraulic jack 32 is actuated by the same control lever 25 that actuates the hydraulic jacks 22, 22 for raising and lowering the front frame 14, so that both frames will be raised or lowered simultaneously.

The operation of the device will be described by way of example as applied to the aeration of a lawn or a golf course green. The vehicle with the spiking wheels raised as shown in FIG. 3 will be driven on driving wheels 3 and steering wheel 5, to the place which it is desired to aerate. Having arrived at that location, through the medium of operating lever 25, the front and rear frames 14 and 27, respectively, will be swung downwardly to force the spiking wheels into the earth and to raise the vehicle frame and wheels off the surface on which they have been supported as illustrated in FIG. 4. This places the whole weight of the vehicle and the operator of the vehicle on the spiking wheels. Through the medium of lever 26, the hydraulic motor 18 is actuated, causing the spiking wheels 15 to be rotated clockwise, thus pulling the vehicle and the rear spiking wheels over the surface being aerated. The spiking wheels are preferably hollow and curved forwardly so that a plug of earth will enter the hollow spikes as they enter the ground and when they come out of the ground the plug will fall out of the spike through a hole or slot on the underside thereof.

The construction of these spikes, commonly called spoons, is known in the art and need not be described in detail. Likewise as is known, spiral coiled springs may surround the spikes. These springs press against the surface of the earth as the spikes come out of the earth and tend to prevent the spike from pulling up earth surrounding the hole made by the spikes.

Often the vehicle will be merely operated in a straight line across the area of lawn which is to be aerated and then the spikes are raised and the vehicle is turned around and operated in another direction. However, on an irregular surface, it is desirable to have means for steering the device when the spiking wheels are in operation and this is provided by means of an arm 33 secured to and extending at right angles to the vertical post 31. An hydraulic jack 34 is pivotally mounted on frame 1 and secured to the outer end of the arm 33. This is activated by lever 35. By swinging the steering arm 33 backwards or forwards the rear frame 27 will be swung to right or left as desired and this will cause the vehicle to change direction even though the wheels 3 and 5 of the vehicle are not in contact with the ground.

In order to accommodate the implement to uneven ground surfaces, the front spiking wheels could be mounted on a single shaft having a universal joint or universal joints permitting bending of the right and left group of spiking wheels up or down relative to one another. Likewise instead of having the hydraulic motor 18 mounted on a platform between the groups of spiking wheels, the motor might have a direct drive on the shaft eliminating the chain and pulley drive 19 illustrated.

As a safety measure, perforated covers 35 and 36 may be secured over the front and rear frames 14 and 27.

We claim:

1. A soil penetrating implement comprising a vehicle frame, vehicle wheels rotatably mounted on the vehicle frame for movably supporting the frame, a front frame and a rear frame hingedly mounted for up and down swinging movement relative to the front end and the rear end, respectively, of the vehicle frame by means of arms extending rearwardly from the front frame and forwardly from the rear frame and pivotally connected to the vehicle frame, front and rear sets of spiking wheels journaled on said front and rear frames respectively, said spiking wheels having a plurality of radially outwardly extending spikes which are adapted to engage the surface on which the vehicle wheels are supported, the spikes on the front and rear sets of spiking wheels being arranged to penetrate the surface in a substantially uniform pattern over an area substantially equal to the width of the implement, and means connected between the vehicle frame and said front and rear frames for swinging said frames downwardly to raise the vehicle frame and vehicle wheels from the surface, causing the spikes to penetrate the surface, driving means mounted on the frame, and means for selectively coupling said driving means to the vehicle wheels to rotate same when they are in engagement with the surface and to at least one set of spiking wheels to rotate same when the spiking wheels are in engagement with the surface.

2. A soil penetrating implement as claimed in claim 1 in which the driving means may be coupled to the front set of spiking wheels, and means is mounted on the vehicle frame and connected to the rear frame to turn the latter around a vertical axis to steer the vehicle when the vehicle wheels are raised.

3. A soil penetrating implement as claimed in claim 2 in which the means for turning the rear frame around the vertical axis comprises a vertical shaft rotatably mounted on the vehicle frame to which shaft the rear frame is secured, and an hydraulic jack mounted on the vehicle frame and connected to the vertical shaft and actuable to rotate the vertical shaft and thus turn the rear frame.

4. A soil penetrating implement as claimed in claim 1 in which the driving means may be coupled to the front spiking wheels through the medium of an hydraulically operated motor mounted on the front frame.

5. A soil penetrating implement as claimed in claim 1 in which the spikes are curved and hollow whereby they are adapted to remove plugs of soil from grass surfaces.

6. A soil penetrating implement as claimed in claim 1 in which the means for raising and lowering the front and rear frames comprises hydraulic jacks, extending between the vehicle frame and said front and rear frames, respectively.